May 26, 1925.
E. C. SCHRADER
1,539,146
AIR CONTROL MEANS FOR GLASS BLOWING MACHINES
Filed July 13, 1922
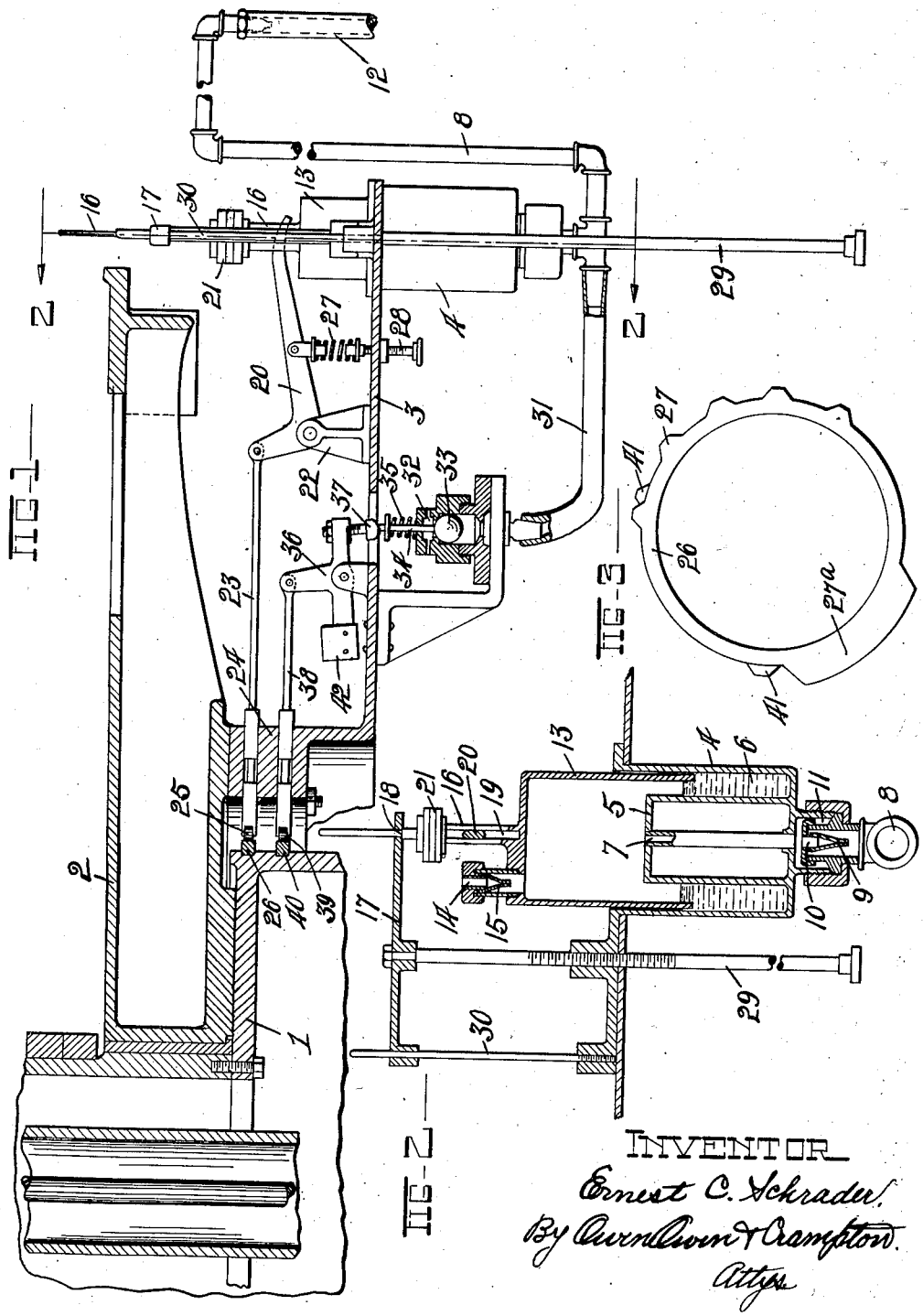
INVENTOR
Ernest C. Schrader
By Owen Owen & Crampton
Attys.

Patented May 26, 1925.

1,539,146

UNITED STATES PATENT OFFICE.

ERNEST C. SCHRADER, OF TOLEDO, OHIO, ASSIGNOR TO THE LIBBEY GLASS MANUFACTURING COMPANY, OF TOLEDO, OHIO, A CORPORATION OF OHIO.

AIR-CONTROL MEANS FOR GLASS-BLOWING MACHINES.

Application filed July 13, 1922. Serial No. 574,630.

*To all whom it may concern:*

Be it known that I, ERNEST C. SCHRADER, a citizen of the United States, and a resident of Toledo, in the county of Lucas and State of Ohio, have made an invention appertaining to an Air-Control Means for Glass-Blowing Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to mechanisms for controlling air pressure in connection with the operation of machinery, especially automatic machinery.

The primary object of the invention is the provision of simple, efficient and economical means for conveniently and automatically controlling air pressures which are utilized as a part of the working means of automatic machinery, and particularly glass working machinery wherein puffs of air are intermittently introduced into gathers of molten glass to cause an expansion of the same into hollow articles of predetermined shape, as for instance electric light bulbs.

The invention is fully described in the following specification, and is illustrated herein in connection with a glass article blowing machine having a rotary frame intended to carry a mechanism (not shown) by which a quantity of molten glass is gathered from a supply source and placed in engagement with the carrying end of a hollow spindle through which air is introduced as desired for the expansion of the gather, the final air puff or blowing operation taking place with the article or gather disposed within a shaping mold, as illustrated in United States Letters Patent No. 1,195,588 to Kadow, dated August 22, 1916.

In the drawings, Figure 1 is a fragmentary vertical section of a machine equipped with an air control means embodying the invention, with parts of the latter broken away. Fig. 2 is an enlarged section on the line 2—2 in Fig. 1, and Fig. 3 is a plan view of the control cams.

Referring to the drawings, 1 designates a standard forming a support and journal on which a table or frame 2 is mounted for rotary horizontal movements and which table is intended to carry certain of the operating parts of the machine, as for instance the mechanism (not shown) for gathering charges of molten glass at a predetermined point or points in a rotation of the table, and a spindle (not shown) to which the gather is usually transferred before the blowing operation, it being understood that in machines of the Kadow type above referred to, the gathering mechanism and receiving spindle are mounted on a common framework for revoluble movements therewith.

An annular platform 3 is disposed below the frame part 2 and is rigidly connected at its inner edge to the under side of the frame, or is supported in any other suitable manner thereby. This platform carries a vertically disposed pump cylinder 2 for each gathering and blowing unit of the machine, the cylinder, in the present instance, being suspended from the outer edge portion of the platform through an opening therein and having its top open. A boss 5 rises from the bottom of the cylinder centrally therein in spaced relation to the cylinder wall and cooperates therewith to form an annular space in which a liquid 6 is disposed. A passage 8 extends down through the boss 5 being open at its top to the interior of the cylinder 4 and is in check valve communication at its bottom with a pipe or air-pressure line 8. The check valve, in the present instance, comprises a thin rubber tube 9 which is held open at its upper end to the passage 7 by a nipple 10 and has its lower end portion normally collapsed so as to check the backward or upward passage of fluid therethrough. The valve is carried within a valve chamber 11 on the bottom of the cylinder 4. The pipe 8 is intended to have connection with the customary blow-spindle through a flexible tube 12, as well understood in the art, whereby the spindle may have movements, if desired, with respect to the pipe 8.

A second cylinder 13, which constitutes the plunger member of the air pump, has its bottom open and extends down into the cylinder 4 for free vertical reciprocatory movements therein.

The lower edge of the cylinder 13 is submerged in the liquid 6 to serve as a sealing means for preventing air from escaping from the interior of the cylinder 13 around its lower edge and out between the telescoped walls of the two cylinders. The upper end of the cylinder 13 is closed except for a check valve controlled inlet opening 14, the check valve of which permits air to enter the cylinder but prevents its escape therefrom. This valve is designated 15 and is preferably, but not necessarily, of the same type as the valve 9. It is evident that a lowering of the cylinder 13 within the cylinder 4 will effect a discharge of air from the interior thereof through the passage 7, valve 9 and pipe 8 and thence to the interior of the blank being blown, and that upon a raising of the cylinder 13 the valve 9 will close and the valve 15 will open to permit air to enter the cylinder through the latter valve from the atmosphere.

The cylinder 13 has a stem 16 projecting upward from its upper end and guided for true vertical movements by an arm or guide member 17 through which it projects. The stem 16 has a shoulder 18 thereon, for co-acting with the arm 17 to limit the upward movements of the cylinder and a portion of the stem, which, in the present instance, is disposed below said shoulder, is provided with a longitudinal slot 19 in which one arm of a control lever 20 is intended to normally support the cylinder 13 in elevated position with the stop shoulder 18 against the guide arm 17 and upon a downward movement of the lever the cylinder 13 is intended to lower to expel a predetermined quantity of air from the cylinders. The purpose of the slot 19 in the stem is to permit the control lever 20 to have a downward movement relative to the cylinder 13 without imparting movement to the cylinder, the cylinder movement being then effected by gravity action or other yielding means which may be provided to act on the cylinder to influence or urge a downward movement thereof when released for such movement by a downward movement of the lever. The lowering of the cylinder 13 is caused, in the present instance, by gravity which may be regulated by placing one or more weights 21 on or removing the same from the stem 16.

The control lever 20 is fulcrumed on a bearing standard 22 rising from the platform 3 at the inner side of the cylinder 13 and has an upwardly extending arm to which the outer end of the push rod 23 is connected. This rod extends through an inner upwardly projecting portion 24 of the platform 3 for free reciprocatory movements radially of the platform and carries a roller 25 at its inner end for bearing against the periphery of a cam ring 26, which encircles a portion of the standard 1.

The ring 26 is provided at predetermined intervals around its periphery with cam projections 27 with which the roller 25 successively coacts during a revolution of the frame 2 and associated parts to cause the rod 23 to have outward movements of predetermined length and to accordingly impart predetermined downward rocking movements to the cylinder engaging end of the control lever 20. It is evident that the greater the downward movement of the lever 20 the greater will be the permissible stroke of downward movement of the cylinder 13 and the resultant discharge of air therefrom into the article blowing parts. It is also evident that the circumferential length of the cam projections determines the period of discharge of air into an article and that if only a puff of air is desired a projection is circumferentially short so that a raising of the lever 20 will quickly follow a lowering movement thereof. The lever 20 is normally held in raised position and the roller 25 retained in engagement with the cam ring 26 by the action of a coiled compression spring 27, which is disposed between the long or horizontally projecting arm of the lever 20 and an adjusting screw 28, which latter is threaded through the platform 3 and permits an adjustment of the tension of the spring.

The guide arm 17 is carried by a vertically disposed control rod 29 which extends down through the platform 3, being threaded for vertical adjustment therein, so that a raising and lowering of the guide arm to adjust the vertical stop position of the upward movements of the cylinder 13 may be effected by a turning of the rod, the upper end of which is swivelled in the guide arm. A guide stem 30 projects up from the platform 3 and loosely through a registering opening in the guide arm 17 to prevent the arm from turning with the control rod.

The pipe 18, in addition to having communication with the pressure creating means, which, in the present instance is formed by the telescoped cylinders 4 and 13, also has communication through a tube 31 with the relief passage 32 to the atmosphere, which passage is controlled by a normally closed check-valve 33. The valve 33 has its stem 34 projecting outward through the valve casing and acted on by a spring 35 to normally retain the valve in seated or passage closing position. A lever 36 is mounted for vertical rocking movements on the top of the platform 3 near the inner edge thereof, and has one arm provided with a tappet 37 for engaging the upper end of the valve stem 34 to impart opening movements thereto when the lever is rocked in one direction, and has another arm connected to a push rod 38 which extends inwardly therefrom to a platform part 24 by which it is guided for reciprocatory movements. The inner end of the rod 38 carries a roller 39, which bears against the periphery of a cam ring 40 whereby peripheral projections 41 on the ring will successively engage the roller 39 as the frame 20 and parts carried thereby revolve and will impart predetermined valve opening rocking movements to the lever 36. The lever 36 has a weighted arm 42, which normally retains the tappet 37 elevated and the roller 39 in coaction with the periphery of the cam ring.

The operation of the air pressure control means is as follows. A glass blank having been placed in connection with the blow spindle (not shown) of the machine, it is desirable to introduce short puffs of air into the blank to effect a gradual expansion thereof and this is accomplished by providing the cam ring 26 at proper positions thereon, depending on the points in a cycle of movement of the machine where it is desired to obtain such puffs, with one or more successively arranged cam projections 27, which are circumferentially short so that a momentary depression of the lever 20 only is effected as the roller 25 passes over each cam projection. Each time the lever 20 is depressed the cylinder 13, which is normally supported thereby, is permitted to lower by gravity, the length of the lowering movement and the consequent volume of air discharged from the interior of the cylinder 13 and into the blank, depending on the radial and circumferential lengths of the actuating cam projection and the speed with which the cylinder 13 follows the lowering movement of the lever 20, which speed is dependent on the cylinder weight and the resistance which the air encounters in its discharge from the cylinder. The number of puffs of air during the blowing operation depends on the number of projections on the cam ring 26. In blowing mechanisms of the class described, it is usually customary to discharge a plurality of short puffs of air into a blank during the initial forming operation of the same and then to insert the blank into a mold for the final blowing operation, one or more long discharges of air into the article usually being given when disposed within the mold. This long discharge of air is effected by providing a long cam projection, as for instance 27ª, at a proper point on the cam ring 26 so that the cylinder 13 may be permitted to make a stroke of longer length and duration than that effected by the cam projections 27. Immediately after the final blowing operation and usually before the mold in which such operation takes place is opened, the roll 39 is engaged by a cam projection 41 and causes an opening of the relief valve 33 for a predetermined period to relieve a portion of the air pressure within the blown article. It is also preferable in some cases to open the relief valve slightly after the introduction of the first puff of air into a blank in order to slightly relieve the pressure of the puff on the blank.

It is found that my air control is more efficient and practicable in its operation than air controls wherein a constant air pressure is present at all times and is placed in communication with a blank by the opening of a valve, and also than those wherein a positively acting air pumping or forcing means is employed. When blowing thin glassware extreme care must be exercised in not exerting too great an air pressure within an article blank before being placed in a shaping mold, and in the case of a constant air pressure supply it is necessary to have such air pressure at very lower pressure for the initial puffs in order to prevent explosion of the articles. With my control means the air pressure which is exerted by a downward movement of the cylinder 13 can be very delicately regulated by an adjustment of the weights 21 on the cylinder and the permissible stroke of said cylinder. Furthermore, the air discharging movement of the cylinder 13, being entirely by gravity or by a yielding means and not positively effected by a movement of the lever 20, enables the cylinder to lower only so fast as the air discharges from the cylinder into the article without exerting undue expanding presure on the article. These are features which are very important in the practical operation of machines of the character described.

I wish it understood that my invention is not limited to any specific construction, arrangement, or form of the parts, or combinations of elements, as it is capable of numerous modifications and changes, without departing from the spirit of the claims.

Having thus described my invention, what I claim as new and desire to secure by Letters Patent, is,—

1. In a machine of the class described, an air pressure pump including two telescoped hollow cylinders reciprocally movable one within the other and having a check valve controlled air inlet opening and a check valve controlled air outlet opening, the movable cylinder normally standing at the inner end of its pressure creating stroke, and a control means for the movable cylinder adapted to retain it at the outer limit of its stroke and operable to release the cylinder to permit it to have inward pumping movements of predetermined length and duration.

2. In a machine of the class described, two telescoped cylinders open at their inner ends, one being reciprocally movable relative to the other to have air pumping strokes, one of said cylinders having a check valve controlled air inlet, and one a check valve controlled air pressure outlet, adjustable gravity means acting on the movable cylinder to normally retain it at the inner end of its pumping stroke, and cam controlled means adapted to retain the movable cylinder at the outer end of its stroke and automatically operable to periodically release the movable cylinder and permit it to have gravity pumping movements of predetermined length and duration.

3. In a machine of the class described, an air pressure creating pump having a reciprocatory member, the pressure creating strokes of which are actuated by gravity, and means adapted to retain the reciprocatory pump member at the outward limit of its stroke and operable to periodically release the member and permit it to have inward gravity movements of predetermined length and duration.

4. In a machine of the class described, an air pressure pump having a vertically movable reciprocatory plunger member movable by gravity to discharge air under pressure from the pump, means for limiting the suction stroke of the pump plunger, and control means for the plunger adapted to hold it at the limit of its suction stroke and operable to periodically release the plunger to permit gravity air discharging movements thereof of predetermined length and duration.

In testimony whereof I have hereunto subscribed my name to this specification.

ERNEST C. SCHRADER.